W. L. Imlay.
Fruit-Jar.
No. 73,724. Patented Jan. 28, 1868.
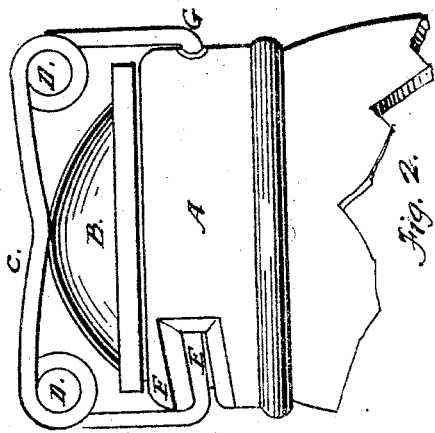
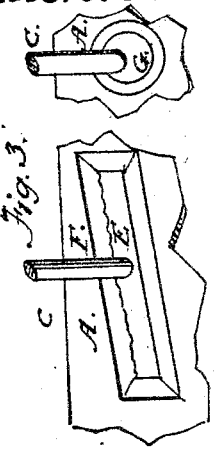
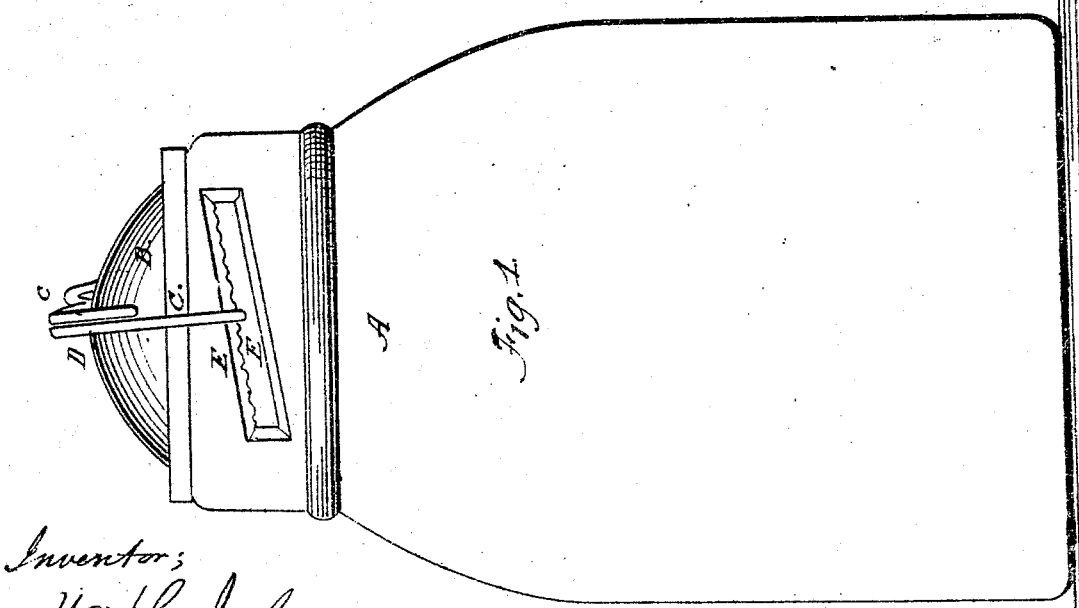
Inventor;
Wm L Imlay
Samuel J. Parker }
Pauline Imlay } Attest;
John A Curley

United States Patent Office.

WILLIAM L. IMLAY, OF PHILADELPHIA, PENNSYLVANIA.

Letters Patent No. 73,724, dated January 28, 1868.

IMPROVEMENT IN CLOSING FRUIT-JARS.

The Schedule referred to in these Letters Patent and making part of the same.

TO ALL WHOM IT MAY CONCERN:

Be it known that I, WILLIAM L. IMLAY, of the city and county of Philadelphia, Pennsylvania, have invented an Improved Lock or Closure for Fruit-Jars; and I do hereby declare the following to be a full and exact description thereof, reference being had to the annexed drawings, and to the letters thereon.

Figure 1 is a view of the side of my jar.

Figure 2, of the bail or loop over its cover.

Figure 3, of the recesses in which the loop is fixed.

My object is to so arrange and construct the bail or loop that secures the jar, that it shall at all times be attached to certain cavities in the neck of the jar, yet be capable of adjustment or tightening therein; and I aid this closure of the jars by springs on the bail or loop, together with the shape of the bail, and of one of the cavities or recesses. This is apparent in the drawings.

In fig. 1, A is the jar, B the cover of the jar, C the bail, with its springs D, and bent into the recesses, of which E is the one, with an inclined and corrugated upper surface, F, and in which recesses the ail is held at all times, both when holding the jar shut and when the jar is open. In fig. 2, the same letters refer to the same parts, the jar, cover, and bail being seen at right angles to the last figure, in side elevation, and D D are the springs on the bail. Fig. 3, at G, shows a view of the hinge or plain recess, on one side of the jar, holding the bail, and at E the oblique recess, always retaining and hinging the other end of the bail, yet allowing it to be slid up or down the corrugated and inclined surface F of the recess. The recess G is round, and the recess E rectangular and inclined.

The uses and advantages of the jar are apparent to those skilled in the art to which it appertains.

Claims.

1. The rectangular recess or cavity E, in the neck of the jar, with its inclined and corrugated side F, retaining the bail, and tightening it by sliding the bail over the corrugations, as shown and described.

2. The combined arrangement and construction of the jar A, cover B, bail or loop C, with its springs D, plain round recess G, rectangular and inclined recess E, corrugations F, substantially as and for the purposes specified.

W. L. IMLAY.

Witnesses:
SAMUEL J. PARKER,
PAULINE IMLAY.